US008412971B2

(12) United States Patent
Branover et al.

(10) Patent No.: US 8,412,971 B2
(45) Date of Patent: Apr. 2, 2013

(54) METHOD AND APPARATUS FOR CACHE CONTROL

(75) Inventors: Alexander Branover, Chestnut Hill, MA (US); Norman M. Hack, Pflugerville, TX (US); Maurice B. Steinman, Marlborough, MA (US); John Kalamatianos, Arlington, MA (US); Jonathan M. Owen, Northborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 191 days.

(21) Appl. No.: 12/777,657

(22) Filed: May 11, 2010

(65) Prior Publication Data
US 2011/0283124 A1 Nov. 17, 2011

(51) Int. Cl.
G06F 1/26 (2006.01)
(52) U.S. Cl. ......... 713/324; 713/323; 713/330; 711/118
(58) Field of Classification Search ............... 713/300
See application file for complete search history.

(56) References Cited

U.S. PATENT DOCUMENTS

| 6,845,437 | B2 | | 1/2005 | Borman | |
|---|---|---|---|---|---|
| 7,051,221 | B2 | * | 5/2006 | Clabes et al. ............ | 713/320 |
| 7,127,560 | B2 | * | 10/2006 | Cohen et al. ............ | 711/141 |
| 7,290,093 | B2 | * | 10/2007 | Edirisooriya et al. ....... | 711/133 |
| 7,395,372 | B2 | * | 7/2008 | Correale et al. ............ | 711/128 |
| 7,404,043 | B2 | * | 7/2008 | Edirisooriya et al. ....... | 711/133 |
| 7,437,513 | B2 | * | 10/2008 | Saida et al. ................ | 711/128 |
| 7,647,514 | B2 | * | 1/2010 | Ishihara et al. ............ | 713/320 |
| 7,904,659 | B2 | | 3/2011 | Moll | |
| 7,966,457 | B2 | | 6/2011 | Pesavento | |
| 8,108,611 | B2 | * | 1/2012 | Usui ......................... | 711/128 |
| 8,156,357 | B2 | * | 4/2012 | Zhang et al. .............. | 713/320 |
| 2004/0133746 | A1 | * | 7/2004 | Edirisooriya et al. ....... | 711/133 |
| 2005/0080994 | A1 | * | 4/2005 | Cohen et al. ............ | 711/118 |
| 2005/0097277 | A1 | * | 5/2005 | Maiyuran et al. .......... | 711/128 |
| 2005/0204202 | A1 | * | 9/2005 | Edirisooriya et al. ........ | 714/39 |
| 2005/0246499 | A1 | * | 11/2005 | Saida et al. ................ | 711/128 |
| 2007/0033423 | A1 | * | 2/2007 | Ishihara et al. ............ | 713/300 |
| 2007/0043965 | A1 | * | 2/2007 | Mandelblat et al. ........ | 713/324 |
| 2007/0083783 | A1 | * | 4/2007 | Ishihara et al. ............ | 713/320 |
| 2008/0104324 | A1 | * | 5/2008 | Raghuvanshi .............. | 711/122 |
| 2010/0146212 | A1 | * | 6/2010 | Cohen et al. ............ | 711/128 |

(Continued)

FOREIGN PATENT DOCUMENTS
EP 1628210 2/2006

OTHER PUBLICATIONS

International Search Report and Written Opinion in application PCT/US2011/035975 mailed Aug. 9, 2011.

*Primary Examiner* — Ryan Stiglic
(74) *Attorney, Agent, or Firm* — Rory D. Rankin; Meyertons, Hood, Kivlin, Kowert & Goetzel, P.C.

(57) ABSTRACT

A method and apparatus for dynamically controlling a cache size is disclosed. In one embodiment, a method includes changing an operating point of a processor from a first operating point to a second operating point, and selectively removing power from one or more ways of a cache memory responsive to changing the operating point. The method further includes processing one or more instructions in the processor subsequent to removing power from the one or more ways of the cache memory, wherein said processing includes accessing one or more ways of the cache memory from which power was not removed.

28 Claims, 10 Drawing Sheets

U.S. PATENT DOCUMENTS

2011/0040940 A1* 2/2011 Wells et al. .................. 711/128
2011/0113198 A1* 5/2011 Cheng et al. ................. 711/128
2011/0320723 A1* 12/2011 Cohen et al. .................. 711/125

* cited by examiner

METHOD AND APPARATUS FOR CACHE CONTROL

BACKGROUND

1. Field of the Invention

This invention relates to processors, and more particularly, to cache memories in processors.

2. Description of the Related Art

Cache memories figure prominently in the performance of computer system processors. As processor technology has advanced and the demand for performance has increased, the number and capacity of cache memories has followed. Some processors may have a single cache or single level of cache memory, while others may have multiple levels of caches. Some cache memories may be used for storing data, while other cache memories may be used for storing instructions, while some may store both. Cache memories for storing other types of information (e.g., address translations) are also used in some processors.

Cache memories may be defined by levels, based on their proximity to execution units of a processor core. For example, a level one (L1) cache may be the closest cache to the execution unit(s), a level two (L2) cache may be the second closest to the execution unit(s), and an level three (L3) cache may be the third closest to the execution unit(s). When accessing information (e.g., an operand) for an instruction to be executed, an execution unit may first query the L1 cache. If the information is not stored in the L1 cache (i.e., a cache miss), the L2 cache may be queried, and so forth. If the information is not stored in any cache, the information may be accessed from other storage such as main memory or from disk storage. Since the latency associated with memory and disk storage accesses is much greater than the latency associated with cache accesses, cache memories have become larger to accommodate more data and/or instructions. However, these larger cache memories may consume more power than their smaller counterparts. Accordingly, some processors may remove power to part or all of a cache memory when the processor is idle.

SUMMARY OF THE DISCLOSURE

A method and apparatus for dynamically controlling a cache size is disclosed. In one embodiment, a method includes changing an operating point of a processor from a first operating point to a second operating point, and selectively removing power from one or more ways of a cache memory responsive to changing the operating point. The method further includes processing one or more instructions in the processor subsequent to removing power from the one or more ways of the cache memory, wherein said processing includes accessing one or more ways of the cache memory from which power was not removed.

In one embodiment, a processor includes at least one execution unit, a cache memory having a plurality of ways, and a power management unit. The power management unit is configured to selectively remove power from a first subset of the plurality of ways responsive to the processor changing an operating point from a first operating point to a second operating point. The at least one execution unit is configured to, subsequent to selectively removing power from the first subset of the plurality of ways, access one or more ways of a second subset of the plurality of ways from which power was not removed.

In another embodiment, a method includes determining a CIPS (committed instructions per second) value for a processor executing instructions, calculating a sum of a threshold value and a guard band value and comparing the CIPS value to the threshold value and the sum. The method further includes selectively removing power from a subset of a plurality of ways of a cache memory if the CIPS value is less than the threshold value, powering on any previously powered down ways of the cache memory if the CIPS value is greater than the sum such that each of the plurality of ways is powered on. If the CIPS value is greater than the threshold value, or less than the sum, then no additional ways of the cache memory are powered on or off.

Another embodiment of a method for dynamically controlling a cache size includes changing a performance state of a processor from a first performance state to a second performance state, wherein the first performance state comprises operating a core of the processor at a first voltage and a first clock frequency. The second performance state comprises operating the core at a second voltage less than the first voltage and a second clock frequency less than the first clock frequency. The method further includes selectively removing power from one or more ways of a cache memory responsive to changing the performance state, and processing one or more instructions in the core of the processor subsequent to removing power from the one or more ways of the cache memory, wherein said processing includes the core accessing one or more ways of the cache memory from which power was not removed.

BRIEF DESCRIPTION OF THE DRAWINGS

Other aspects of the invention will become apparent upon reading the following detailed description and upon reference to the accompanying drawings in which.

Figure 1:
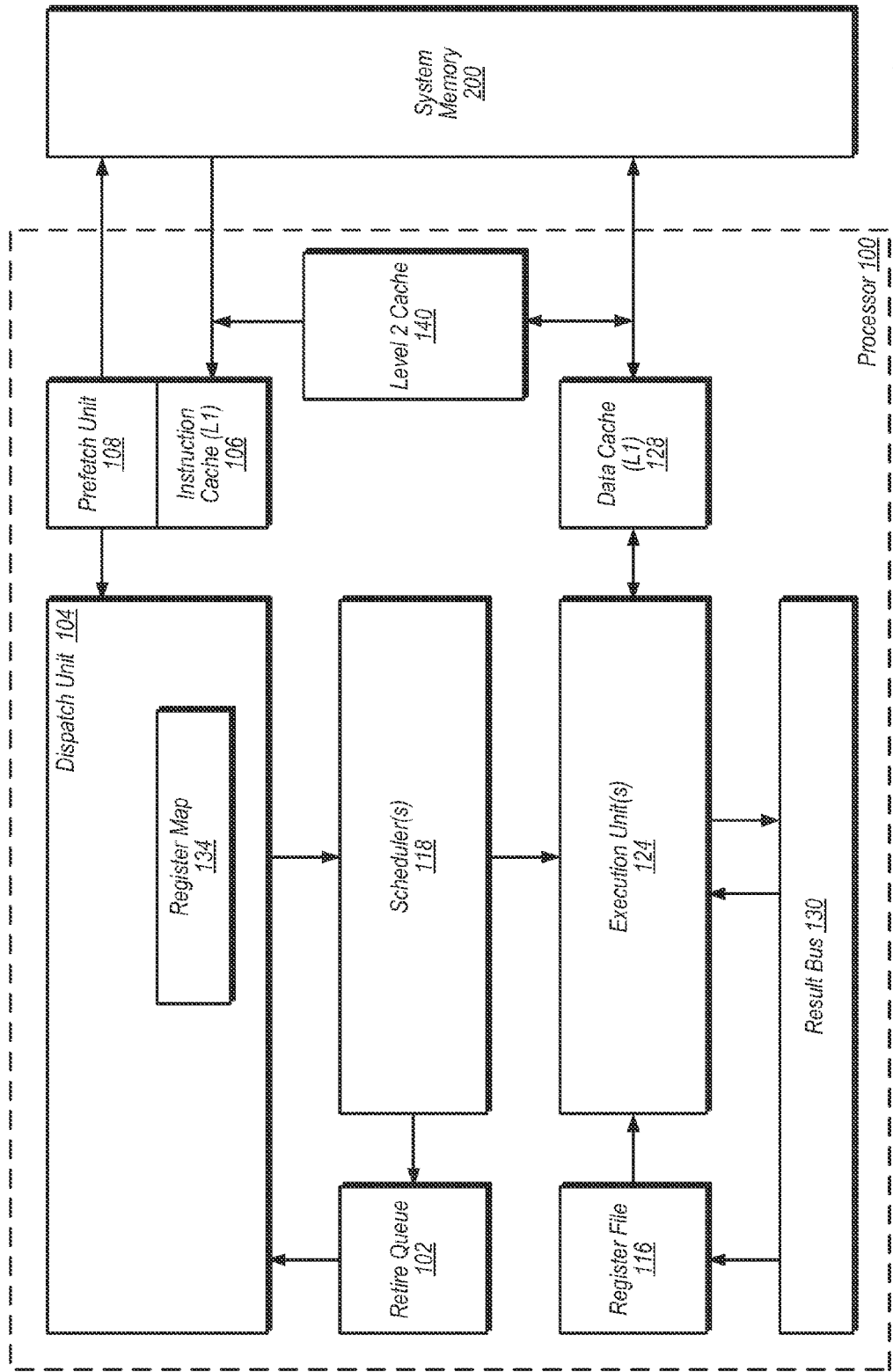
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview of Processor Embodiments

FIG. 1 is a block diagram of one embodiment of a processor 100. The processor 100 is configured to execute instructions stored in a system memory 200. Many of these instructions operate on data stored in the system memory 200. It is noted that the system memory 200 may be physically distributed throughout a computer system and/or may be accessed by one or more processors 100.

In the illustrated embodiment, the processor 100 may include a level one (L1) instruction cache 106 and an L1 data cache 128. The processor 100 may include a prefetch unit 108 coupled to the instruction cache 106. A dispatch unit 104 may be configured to receive instructions from the instruction cache 106 and to dispatch operations to the scheduler(s) 118. One or more of the schedulers 118 may be coupled to receive dispatched operations from the dispatch unit 104 and to issue operations to the one or more execution unit(s) 124. The execution unit(s) 124 may include one or more integer units, one or more floating point units, and one or more load/store units. Results generated by the execution unit(s) 124 may be output to one or more result buses 130 (a single result bus is shown here for clarity, although multiple result buses are possible and contemplated). These results may be used as operand values for subsequently issued instructions and/or stored to the register file 116. A retire queue 102 may be coupled to the scheduler(s) 118 and the dispatch unit 104. The retire queue 102 may be configured to determine when each issued operation may be retired.

In one embodiment, the processor 100 may be designed to be compatible with the x86 architecture (also known as the Intel Architecture-32, or IA-32). In another embodiment, the processor 100 may be compatible with a 64-bit architecture. Embodiments of processor 100 compatible with other architectures are contemplated as well.

Note that the processor 100 may also include many other components. For example, the processor 100 may include a branch prediction unit (not shown) configured to predict branches in executing instruction threads. Processor 100 may also include a memory controller configured to control reads and writes with respect to memory 200.

The instruction cache 106 may store instructions for fetch by the dispatch unit 104. Instruction code may be provided to the instruction cache 106 for storage by prefetching code from the system memory 200 through the prefetch unit 108. Instruction cache 106 may be implemented in various configurations (e.g., set-associative, fully-associative, or direct-mapped).

Processor 100 may also include a level two (L2) cache 140. Whereas instruction cache 106 may be used to store instructions and data cache 128 may be used to store data (e.g., operands), L2 cache 140 may be a unified used to store instructions and data. Although not explicitly shown here, some embodiments may also include a level three (L3) cache. In general, the number of cache levels may vary from one embodiment to the next.

The prefetch unit 108 may prefetch instruction code from the system memory 200 for storage within the instruction cache 106. The prefetch unit 108 may employ a variety of specific code prefetching techniques and algorithms.

The dispatch unit 104 may output operations executable by the execution unit(s) 124 as well as operand address information, immediate data and/or displacement data. In some embodiments, the dispatch unit 104 may include decoding circuitry (not shown) for decoding certain instructions into operations executable within the execution unit(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register and the register file 116 may store a committed register state for each register). A register map 134 may translate logical register names of source and destination operands to physical register numbers in order to facilitate register renaming. The register map 134 may track which registers within the register file 116 are currently allocated and unallocated.

The processor 100 of FIG. 1 may support out of order execution. The retire queue 102 may keep track of the original program sequence for register read and write operations, allow for speculative instruction execution and branch misprediction recovery, and facilitate precise exceptions. In some embodiments, the retire queue 102 may also support register renaming by providing data value storage for speculative register states (e.g. similar to a reorder buffer). In other embodiments, the retire queue 102 may function similarly to a reorder buffer but may not provide any data value storage. As operations are retired, the retire queue 102 may deallocate registers in the register file 116 that are no longer needed to store speculative register states and provide signals to the register map 134 indicating which registers are currently free. By maintaining speculative register states within the register file 116 (or, in alternative embodiments, within a reorder buffer) until the operations that generated those states are validated, the results of speculatively-executed operations along a mispredicted path may be invalidated in the register file 116 if a branch prediction is incorrect.

In one embodiment, a given register of register file 116 may be configured to store a data result of an executed instruction and may also store one or more flag bits that may be updated by the executed instruction. Flag bits may convey various types of information that may be important in executing subsequent instructions (e.g. indicating a carry or overflow situation exists as a result of an addition or multiplication operation. Architecturally, a flags register may be defined that stores the flags. Thus, a write to the given register may update both a logical register and the flags register. It should be noted that not all instructions may update the one or more flags.

The register map 134 may assign a physical register to a particular logical register (e.g. architected register or microarchitecturally specified registers) specified as a destination operand for an operation. The dispatch unit 104 may determine that the register file 116 has a previously allocated physical register assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in the register file 116) through a load/store unit (not shown). Operand data values may be provided to the execution unit(s) 124 when the operation is issued by one of the scheduler(s) 118. Note that in alternative embodiments, operand values may be provided to a corresponding scheduler 118 when an operation is dispatched (instead of being provided to a corresponding execution unit 124 when the operation is issued).

As used herein, a scheduler is a device that detects when operations are ready for execution and issues ready operations to one or more execution units. For example, a reservation station may be one type of scheduler. Independent reservation stations per execution unit may be provided, or a central reservation station from which operations are issued may be provided. In other embodiments, a central scheduler which retains the operations until retirement may be used. Each scheduler 118 may be capable of holding operation information (e.g., the operation as well as operand values, operand tags, and/or immediate data) for several pending operations awaiting issue to an execution unit 124. In some embodiments, each scheduler 118 may not provide operand value storage. Instead, each scheduler may monitor issued operations and results available in the register file 116 in order to determine when operand values will be available to be read by the execution unit(s) 124 (from the register file 116 or the result bus 130).

In some embodiments, one or more of the caches shown therein may be dynamically resized during operation by selectively powering down or powering up certain cache ways. The processor may continue operating in an active state even after some of the ways of a given cache have been powered down. The remaining cache ways (i.e. those cache ways for which power is still provided) may be accessed during the execution of instructions by the one or more execution unit(s) 124. Thus, instead of powering down cache ways only when processor 100 is idle, some cache ways may be powered down while still allowing processor 100 to remain in an active state. This may in turn reduce power consumption while allowing processor to continue activity. Various embodiments of processor 100 and a method for dynamically controlling the cache size in order to conserve power will now be discussed in further detail, beginning with FIG. 2.

Figure 2:
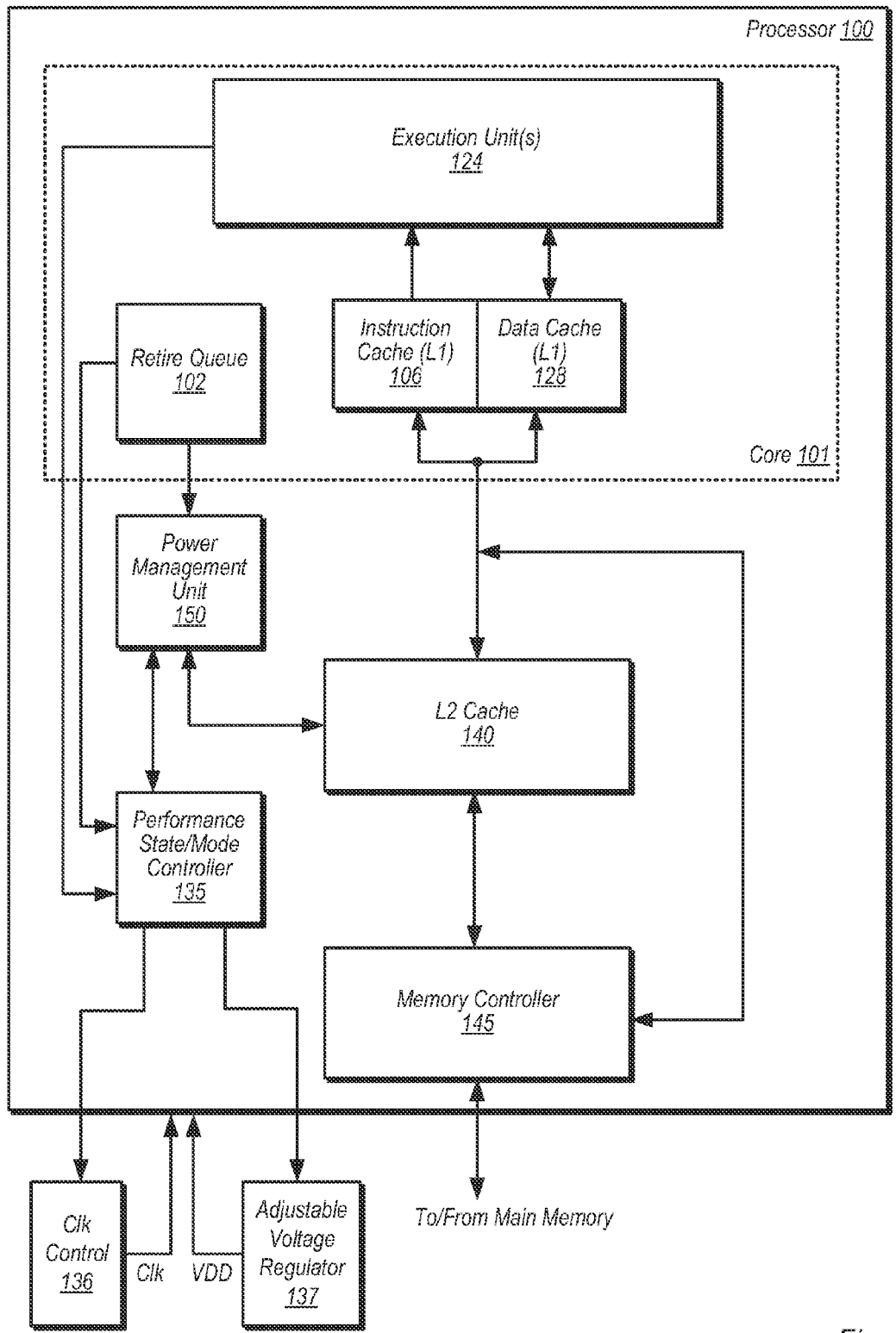
FIG. 2 is a block diagram of another embodiment of a processor.

FIG. 2 is a block diagram of another embodiment of a processor. Particular units that are also included in FIG. 1 are designated the same here, and may perform the same or similar functions in the embodiment of FIG. 2. In the embodiment shown, processor 100 includes, in addition to various units discussed above, a power management unit 150, a performance state/mode controller 135 (hereinafter 'state controller 135'), and a memory controller 145. A clock control circuit 136 and an adjustable voltage regulator 137 are also shown as being coupled to processor 100 in the embodiment shown, although embodiments wherein these units are implemented on-chip (i.e. on the same IC die as processor 100) are possible and contemplated. For example, the functions of clock control and voltage regulation/control may be implemented into state controller 135.

In the embodiment shown, processor 100 includes a power management unit coupled to L2 cache 140, the size of which is dynamically controllable by selectively controlling which ways are powered on at a given time. Selected ways of L2 cache 140 may be powered down when the workload of execution unit(s) 124 decreases. Similarly, when a number of cache ways are powered down, selected ways of L2 cache 140 may be powered up if the workload of execution unit(s) 124 increases. Embodiments wherein an L1 cache is similarly controllable are possible and contemplated, and an example will be discussed in further detail below.

One or more of a number of various metrics may be used by power management unit 150 in determining whether certain ways of L2 cache 140 are to be powered down. An operating point of the processor may be defined by at least one of the metrics, and may be defined by a combination of metrics. In the embodiment of FIG. 2, processor 100 is configured to operate in various performance states ('P-states'), each of which may be defined by a particular operating voltage and a particular operating frequency. Processor 100 may further be configured to operate in a power saving mode (wherein an emphasis is placed on conserving power, e.g. when operating on battery power) and a performance mode (wherein an emphasis is placed on maximizing performance). Table 1 below illustrates various cache sizing actions that may be taken for a combination of various P-states and operating modes.

TABLE 1

| P-State | Frequency | Voltage | L2 Size in Power Saving Mode | L2 Size In Performance Mode |
|---------|-----------|---------|------------------------------|------------------------------|
| P0 | 2 GHz | 1.1 V | All Cache Ways On | All Cache Ways On |
| P1 | 1.8 GHz | 1.0 V | All Cache Ways On | All Cache Ways On |
| P2 | 1.5 GHz | 0.9 V | ½ Cache Ways On | All Cache Ways On |
| P3 | 1 GHz | 0.85 V | ¼ Cache Ways On | ½ Cache Ways On |
| P4 | 800 MHz | 0.8 V | ¼ Cache Ways On | ¼ Cache Ways On |
| P5 | 200 MHz | 0.7 V | All Cache Ways Off | ¼ Cache Ways On |

Table 1 may be applied to the embodiment of processor 100 discussed above, as well as to other embodiments of a processor. Furthermore, other processor embodiments are possible and contemplated wherein the particular scheme shown in Table 1 above is different. In this particular implementation, all ways of L2 cache 140 may be turned on when operating in the P0 and P1 states (which comprise the two highest operating voltages and two highest clock frequencies), regardless of whether processor 100 is operating in the power saving mode or the performance mode. When operating in the P2 state, all of the cache ways may be turned on if operating in the performance mode, while ½ of the number of cache ways may be turned off if operating in the power saving mode. The cache ways that remain turned on may be accessible to execution unit(s) 124 for retrieving data and/or instructions that are stored therein. When processor 100 is operating in the P3 state, ¼ of the cache ways may remain powered on if in the power saving mode, while ½ of the cache ways may be powered on in the performance mode. In the P4 and P5 states, ¼ of the cache ways may be powered on if operating in the performance mode. When operating in the power saving mode, ¼ of the cache way may be powered on if in the P4 state, while the cache may be entirely powered down when in the P5 state.

The information shown above in Table 1 may be stored in a storage structure in power management unit 150. State controller 135 may provide information to power management unit 150 indicating the particular operating point of processor 100, which may include information regarding the P-state, the performance mode, both, and/or other information. Power management unit 150 is also coupled to receive information from retire queue 102 regarding instructions that are to be, or have been retired. Power management unit 150 may use the information received from state controller 135 and/or retirement queue 102 in order to determine what cache sizing actions, if any, are to be taken. In other embodiments, power management unit 150 may incorporate functions of other units discussed above, and as such may be able to generate the information regarding operating point and retired instructions rather than receiving it from an external source.

State controller 135 in the embodiment shown is configured to perform control actions in order to control the operating point of processor 100. Information received by state controller 135 from retire queue 102 and/or execution unit(s) 124, among other places, may be used to determine the workload of processor 100. For example, state controller 135 may track the number and/or type of instructions retired over a given time interval. Similarly, controller 135 may receive information from execution unit(s) 124 regarding the number and type of instructions that have been issued for execution. Although not explicitly shown here, state controller 135 may also be coupled to scheduler(s) 118 shown in FIG. 1, which may provide information on instructions that are scheduled to be executed. In various embodiments state controller 135 may receive information from other processing nodes (e.g., other processor cores in multi-core processors, and/or other processors in multi-processor computers) regarding their particular operating points.

The information received by state controller 135 from the various sources may be used to determine an appropriate operating point for the processor, based on factors such as workload, available power, power and frequency limits, and so forth. Upon determining a particular operating point for processor 100 (or a core 101 of processor 100, in the case of multi-core embodiments), state controller 135 may perform various actions to effectuate the state change. In this particular embodiment, state controller 135 may provide signals to clock controller 136 and adjustable voltage regulator 137 to change the operating voltage and/or clock frequency to change the operating point of processor 100 (although as noted above, these functions may be incorporated into state controller 135 in other embodiments). Additionally, signals may be provided from state controller 135 to provide power management unit 150 with information regarding any change of operating point. Furthermore, power management unit 150 may provide information to state controller 135 of which actions, if any, have been taken with regard to the dynamic sizing of L2 cache 140.

Figure 3:
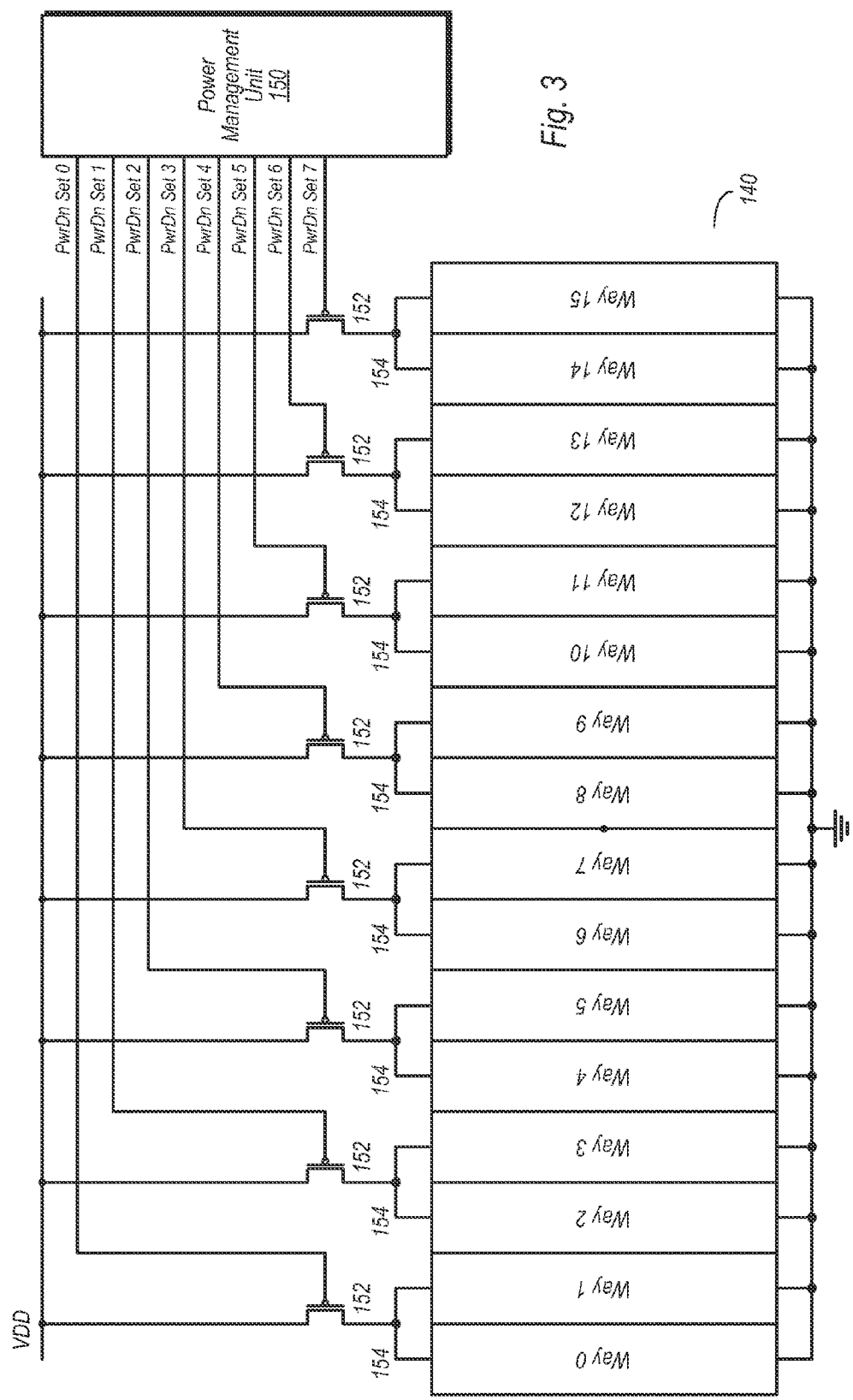
FIG. 3 is a block diagram illustrating one embodiment a power management unit coupled to an embodiment of a cache memory.

Power Management of a Cache:

Turning now to FIG. 3, a block diagram illustrating one embodiment of a power management unit coupled to an embodiment of a cache memory is shown. In the embodiment shown, power management unit 150 is coupled to a cache 140. In this particular example, cache 140 is a 16-way set associative cache having 2 ways per set (i.e. per group). However, other embodiments are possible and contemplated wherein the number of ways, the number of sets (groups), or number of ways per group are different than that showed here. Furthermore, direct-mapped and fully associative caches are also possible and contemplated for use in the various method and apparatus embodiments discussed herein.

In the embodiment shown power management unit 150 is coupled to each of a plurality of PMOS (p-type metal oxide semiconductor) transistors 152. PMOS transistors 152 in the embodiment shown act as switches for coupling or decoupling a global power node VDD to/from corresponding local voltage nodes 154. In other embodiments, devices/circuits such as passgates may be used in lieu of the singular PMOS transistors 152 shown here. In general, any suitable switching device may be implemented to couple and decouple a global voltage node from a local voltage node. It is also noted that embodiments are possible and contemplated wherein switching devices are used to couple/decouple local ground nodes to/from a global ground node. Such switching devices may be used in conjunction with, or as an alternative to, switching devices that couple and decouple a global voltage node with local voltage nodes.

Each of PMOS transistors 152 may be turned on when its respective gate terminal is driven low. Power management unit 150 in this embodiment is configured to drive a power down signal ('PwrDn Set 0', 'PwrDn Set 1', etc.) for each group of two ways in the embodiment shown. If a particular group of ways is to be powered down, its corresponding power down signal may be driven high by power management unit 150. The corresponding PMOS transistor 152 may be deactivated responsive to the high signal on its gate terminal. When PMOS transistor 152 is deactivated, power from global power node VDD is decoupled from a local power node coupled to the corresponding group of ways. Accordingly, power management unit 150 in the embodiment shown may selectively power down any one of the groups independent of the other groups. When powering down a number of groups (e.g., ½ of the total number) responsive to a change of operating point, power management unit 150 may power down contiguous groups, may selectively power down non-contiguous groups, or perform a combination of these two options.

Figure 4:
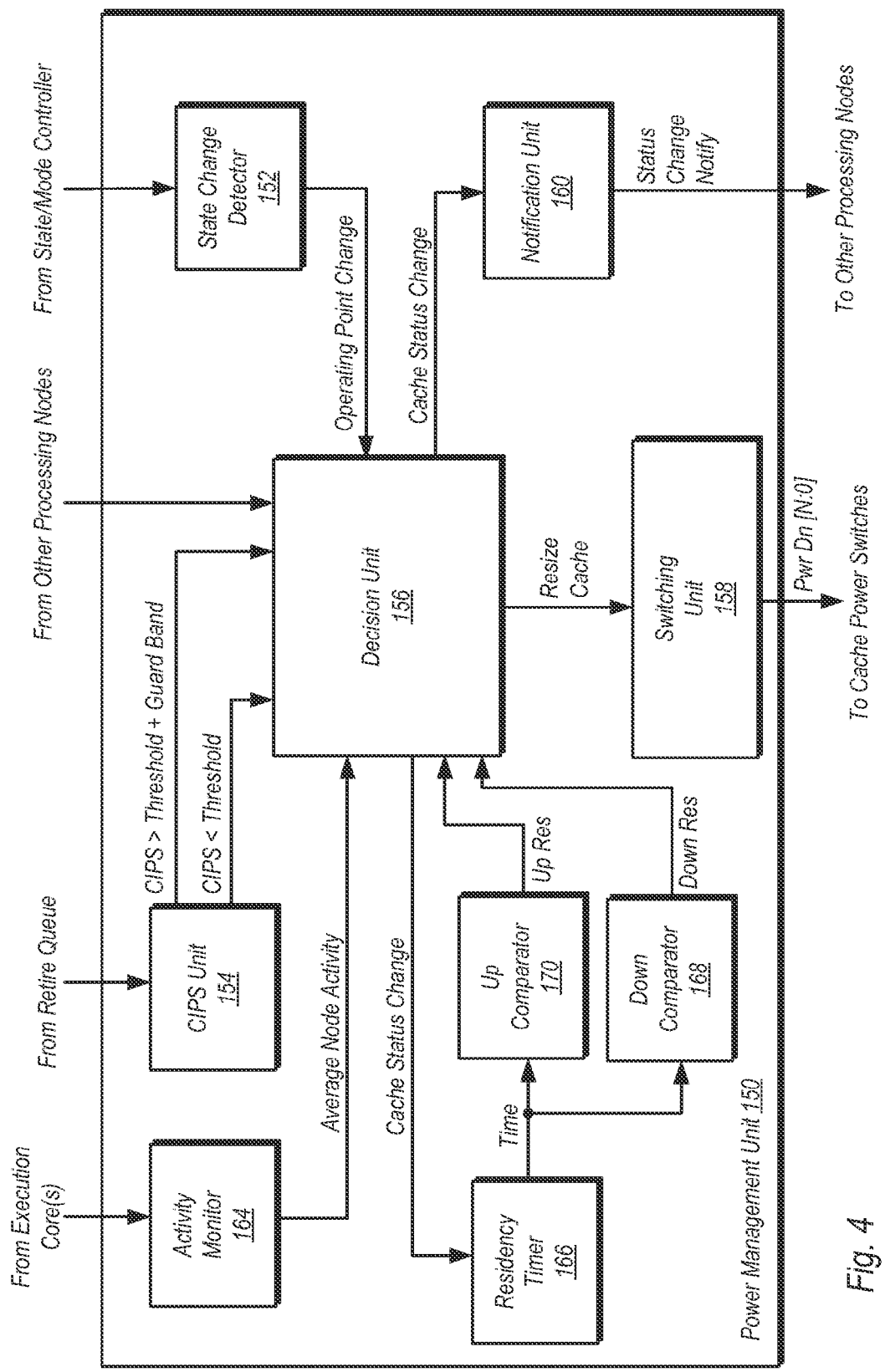
FIG. 4 is a block diagram of one embodiment of a power management unit.

FIG. 4 is a block diagram of one embodiment of a power management unit. In the embodiment shown, power management unit 150 includes a decision unit 156, which is coupled to receive information from various sources and configured to determine which cache resizing actions are to be taken, if any. In addition, decision unit 156 is configured to provide signals indicating a change of status (e.g., a cache resizing action) that may be used internally by various units. Units of power management unit 150 configured to receive information from an external source include, in this embodiment, activity monitor 164, CIPS (committed instructions per second) unit 154, and state change detector 152 and decision unit 156. Notification unit 160 and switching unit 158 are configured to provide information to units external to power management unit 150. In addition, power management unit 150 includes a residency timer 166, a down comparator 168, and an up comparator 170.

In the embodiment shown, state change detector 152 is coupled to receive signals from state controller 135 indicating a change of operating point. The operating point information may include the P-state, the mode (i.e. power saving or performance) and any other pertinent information regarding the operating point of processor 100. State change detector 152 may provide a signal or signals ('Operating Point Change') to decision unit 156 indicating that the operating point has changed, as well as providing information identifying the new operating point.

Decision unit 156 may use information regarding the state of the processing node (which may be a core 101 or the entire processor 100) in order to indicate whether or not cache resizing actions are necessary, along with what specific actions to take if so. In addition, decision unit 156 may also use information regarding the state of other processing nodes in multi-core processor embodiments and/or multi-processor computer systems. Such systems may re-allocate power among the processing nodes such that when one node enters a state in which it consumes less power, another node may consume more power if necessary to satisfy workload demands.

If decision unit 156 determines that the cache is to be resized by powering down or powering up selected ways or sets, one or more signals ('Resize Cache') may be sent to switching unit 158. Responsive to receiving these signals, switching unit 158 may generate one or more signals ('Pwr Dn [N:0]') for powering up or powering down selected cache ways or sets. Using the embodiment of FIG. 3 as a corresponding example, switching unit 158 may assert one or more active high signals that may be received on the gates of PMOS transistors 152, thereby causing corresponding sets of cache ways to be powered down. If selected cache ways or sets are to be powered up, switching unit 158 may de-assert the active low signals, resulting in a low on the gate terminals of corresponding PMOS transistors 152 and thus resulting in their activation and the powering up of the corresponding sets of cache ways. It is noted here that this example is but one possible embodiments, and such signals may be active high or active low, in accordance with the switching devices that are used to couple/decouple cache ways/sets to and from a global voltage supply node and/or ground node.

Upon resizing the cache, decision unit 156 may send a notification ('Cache Status Change') of the change to notification unit 160. In turn, notification unit 160 may send information to other processing nodes informing them of the change ('Status Change Notify'), including information regarding the specifics of the change (e.g., the number of cache ways or sets that were powered down or up), the type of cache (e.g., L1, L2, L3, etc.) and so forth. In another embodiment, as will be discussed in further detail below, notification unit 160 may send information regarding the resizing of a cache to a controller that may be used to allocate power among various units of processor 100.

In addition to sending the notification of the cache resizing to notification unit 160, decision unit 156 may also provide the same information to residency timer 166. In the case of residency timer 166, the information may be reduced to a single signal used as a reset signal. Upon receiving the signal, residency signal may begin running, and may provide the current time since the cache resizing. The time may be compared to first and second time thresholds. These thresholds may be indicative of minimum residency requirements for cache resizing actions. One threshold may establish a minimum residency for an upward resizing action (i.e. when more cache ways/sets are powered up), while another threshold may establish a minimum residency for a downward resizing action (i.e. when more cache ways/sets are powered down).

Up comparator 170 may compare the time value with a threshold establishing a minimum residency for the current cache size before and additional ways/sets may be powered up again. Down comparator 168 may compare the time value with a threshold establishing a minimum residency for the current cache size before additional ways/sets may be powered down again. The time thresholds may be the same in some cases, and thus a single comparator may be used instead of the two comparators shown here. Embodiments are also possible and contemplated wherein the threshold value may be programmable, and/or may change based on a specific operating point of the processor or processing node. For example, when operating on a battery (or in a power saving mode), the minimum residency for an upward resizing action may be longer than when operating in a performance mode. Similarly, the minimum residency for a downward resizing of the cache may be smaller in a power saving mode than in a performance mode. The reverse may be true when operating in the performance mode, with the minimum residency being shorter for an upward resizing action and longer for a downward resizing action.

Decision unit 156 in the embodiment shown is coupled to receive a first signal ('Up Res') from up comparator 170, and a second signal ('Down Res') from down comparator 168. These signals may be asserted when their respective comparator determines that the time value received from residency time 166 exceeds their respective thresholds. Decision unit 156 may inhibit further cache resizing actions if one or both of these signals is not asserted. For example, if an operating point change occurs that would otherwise result in the cache being resized by powering up additional cache ways/sets, the resizing action may be inhibited until up comparator 170 asserts the Up Res signal, thereby indicating that minimum residency for the current cache size has been established before powering on additional ways/sets. Similarly, if an operating point change occurs that would otherwise result in the cache being resized by powering down additional ways/sets, decision unit 156 may inhibit the resizing of the cache downward until down comparators 168 indicates that the minimum residency for an additional downward resizing action has been established. By using residency requirements as determined by up comparator 170 and down comparator 168, decision unit 156 may prevent thrashing of the cache, i.e., a too-frequent resizing of the cache. Such thrashing may lead to extra power consumption, an increase in power supply noise, and may degrade the computing performance of the processor.

In the embodiment shown, power management unit 150 includes an activity monitor 164 that is configured to monitor instruction execution activity. Activity monitor 164 in this embodiment is coupled to receive information form execution unit(s) 124 (e.g., of FIG. 2). Using the information received form the execution unit(s) 124, activity monitor may calculate the average activity for the corresponding processing node (e.g., core 101 in this case) over a predetermined time interval. Activity monitor 164 may receive information about instructions executed, pipeline stalls, or any other type of information indicative of the activity of the execution unit(s). Such information may be useful in determining whether or not the cache may be resized. For example, if activity monitor 164 determines that a significant amount of time in each time interval is spent in a pipeline stall, it may be possible to resize the cache down because the additional latency associated with cache misses is less likely to have a large impact on overall performance. On the other hand, if activity monitor 164 determines that a large number of instructions are being executed during each interval (indicating a relatively full pipeline), it may be desirable to resize the cache upward, since the high latency and possible pipeline stall from a cache miss could adversely impact the pipeline efficiency.

The activity information generated by activity monitor 164 may be provided to decision unit 156 ('Average Node Activity'), and may be used in determining whether it is necessary to resize the cache. In some embodiments, or in some modes of operation, this information may be used exclusively by decision unit 156 to determine the need for cache resizing operations. In other embodiments, the information received from activity monitor 164 may be used in conjunction with other information received by decision unit 156.

Power management unit 150 also includes CIPS unit 154, which may receive information indicating the number of executed instructions in which the results therefrom are committed to registers, over an interval of one second. As noted above, CIPS is "committed instructions per second", and is thus indicative of a workload of the processor. In the embodiment shown, CIPS unit 154 is coupled to receive information regarding retired instructions from a retirement queue (e.g., retirement queue 102 of FIGS. 1 and 2). CIPS unit 154 may determine a number of instructions retired in a predetermined interval, and may use this value to extrapolate the CIPS value. The CIPS value may thus be indicative of the rate at which instructions are executed and actually retired (as opposed to some instructions that are speculatively executed and not retired, e.g., due to a branch misprediction). The CIPS value may be used in conjunction with other values to generate additional information usable by decision unit 156 to determine whether to perform a cache resizing. In this particular embodiment, CIPS unit 154 may calculate a sum of a threshold value and a guard band (or hysteresis) value, using both the threshold and sum values as a basis of comparison. CIPS unit 154 may assert a first signal ('CIPS>Threshold+Guard Band'), a second signal ('CIPS<Threshold'), or no signal. Decision unit 156 is coupled to receive the first and second signals, and may determine for a given interval whether or not cither of these signals was asserted. In one embodiment, cache resizing actions may be taken on the basis of Table 2 below.

TABLE 2

| P-State | CIPS Threshold | Cache Sizing Action |
|---|---|---|
| P0 | Threshold 0 | Full Cache Size |
| P1 | Threshold 1 | Full Cache Size |
| P2 | Threshold 2 | If (CIPS < Threshold 2), then Cache Size = ½ Cache Size; else IF (CIPS > Threshold 2 + Guard Band), then Cache Size = Full Cache; else No Change to Cache Size |
| P3 | Threshold 3 | If (CIPS < Threshold 3), then Cache Size = ¼ Cache Size; else IF (CIPS > Threshold 3 + Guard Band), then Cache Size = Full Cache; else No Change to Cache Size |
| P4 | Threshold 4 | If (CIPS < Threshold 4), then Cache Size = ¼ Cache Size; else IF (CIPS > Threshold 4 + Guard Band), then Cache Size = Full Cache; else No Change to Cache Size |

In Table 2 above, an example is shown wherein one embodiment of decision unit 156 may consider both the P-state and a CIPS value in determining whether or not to perform a cache resizing action, as well as determining what the action is to be. For this particular embodiment, each P-state is associated with a threshold value unique to that P-state. However, embodiments are possible and contemplated wherein a single threshold value is used for all P-states, as well as embodiments wherein additional threshold values are possible (e.g., a first threshold value for a given state when operating in performance mode, and a second threshold value for the given state when operating in the power saving mode).

For P-state 0 and P-state 1 in this embodiment, the cache size may remain at its full size. If the processing node is operating in P-state 2, a determined CIPS value may be used to determine a cache resizing operation without a further state change. If the CIPS value is greater than the sum (i.e., the threshold 2+guard band), the cache may be resized upward to its full size, regardless of its previous size. In this case, the CIPS value is indicative of a high rate of retired instructions and thus a high or compute-bounded workload. If the CIPS value is less than the threshold value (threshold 2), then the cache may be resized from a full size cache to a ½ cache. If the CIPS value is greater than the threshold value but less than the sum value, then the cache is not resized in this example. The algorithms for determining cache resizing actions for P-state 3 and P-state 4 are similar to that of P-state 2 in this embodiment, differing primarily in the threshold values used and the resulting sum values used. Additional embodiments of algorithms that may be utilized by CIPS unit 154 will be discussed in further detail below.

Upon resizing the cache, decision unit 156 may send a notification ('Cache Status Change') of the change to notification unit 160. In turn, notification unit 160 may send information to other processing nodes informing them of the change ('Status Change Notify'), including information regarding the specifics of the change (e.g., the number of cache ways or sets that were powered down or up), the type of cache (e.g., L1, L2, L3, etc.) and so forth.

An additional factor may also include a determination of whether a particular program or sequence of instructions is processor bounded or memory bounded. A compute-bounded application may require frequent cache access and may be latency intolerant, and thus may achieve higher performance with a maximum cache size. A memory-bounded application may perform frequent memory accesses (causing high turnover in the information stored in the cache) with longer execution stalls, and may thus be more latency tolerant since the cache miss penalties are expected. Thus, for memory-bounded applications, the cache size may be reduced without significantly impacting performance. Such information may be provided to decision unit 156 via an operating system executing on the computer system in which the processing node is implemented.

Accordingly, decision unit 156 of power management unit 150 may determine what cache resizing operations are to be performed based on a number of different factors. These factors may include P-state, operating mode (power saving or performance), CIPS, average activity, and information regarding other processing nodes and power allocation. Decision unit 156 may be configurable to base cache resizing information on only a single one of these factors, or on any combination thereof.

Figure 5:
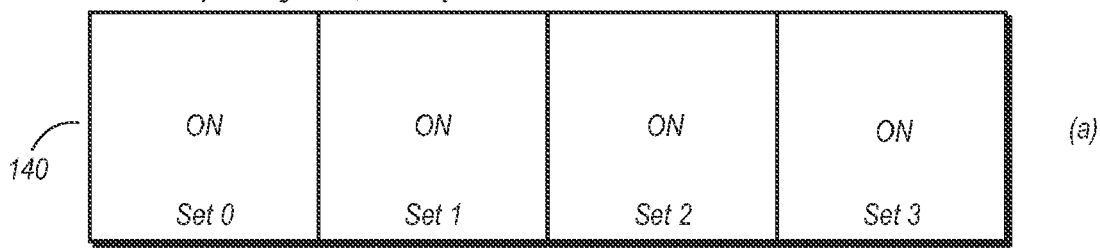
FIG. 5 is a series of block diagrams illustrating dynamic control of a cache memory for different operating points of a processor.
Figure 5:
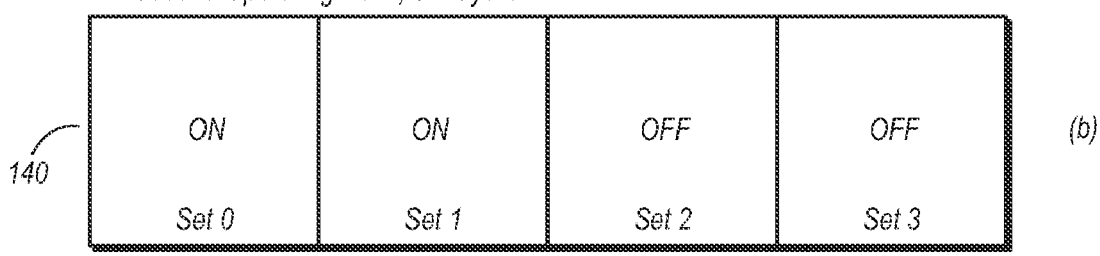
Figure 5:
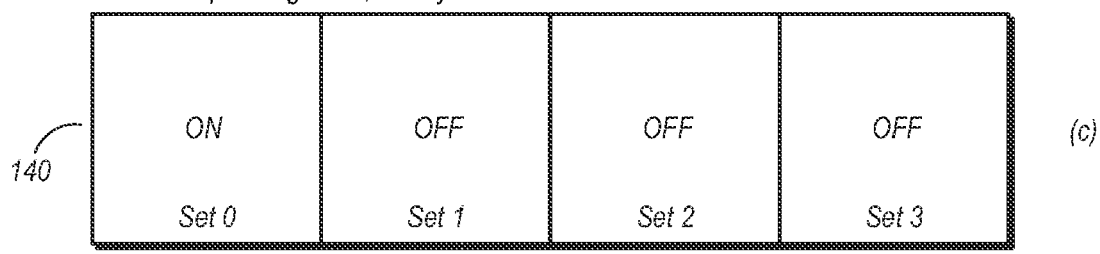
Figure 5:
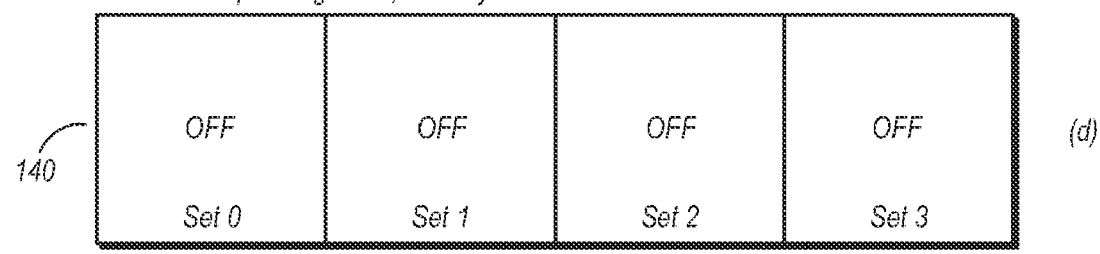

Turning now to FIG. 5, a series of block diagrams illustrating dynamic control of a cache memory for different operating points of a processor is shown. Cache 140 in the embodiment shown is a 16 way set-associative cache having 4 ways per set or group. However, as noted above, embodiments having a different number of ways, group, or ways per group are also possible and contemplated, as are direct-mapped and fully associative caches. In general, cache resizing according to the disclosure herein may be performed with any particular granularity that is feasible for a given implementation.

In (a) of the example shown, all ways of cache 140 are on. This cache size may be utilized when the performance demand is high for the processor in which cache 140 is implemented. In accordance with the various embodiments discussed above, all cache ways may be on when operating in P-state 0, when operating in the performance mode, when a high CIPS value is detected or when a high average activity level is detected, among other examples.

In (b) of the example shown 8 of the 16 cache ways have been powered down, with the remaining cache ways still powered on and accessible. Transition to state (b) from state (a) may occur in conjunction with transition to a lower power P-state (e.g., from P-state 1 to P-state 2), a transition from the performance mode to the power savings mode when in a certain P-state (e.g., when operating in P-state 2), when a lower CIPS level is detected, or when a lower average activity level is detected.

In (c), yet another cache resizing action has taken place, this time reducing the number of powered on ways by one half, from 8 ways to 4 ways. The events triggering this cache resizing may be similar to those above. Although 12 out of the 16 total cache ways are powered down in this example. 4 ways may still be accessible for data and or instructions by the execution units of a processing node.

In (d) all cache ways have been powered down. This cache resizing action may occur responsive to entering a lowest order P-state (e.g., P-state 5 from the examples discussed above), entering a sleep mode, and so forth.

The sequence shown in FIG. 5, from (a) to (d) may also be performed in reverse. For example, if exiting a sleep mode in which all cache ways are powered off, at least four or more cache ways may be powered on in the embodiment of cache 140 shown in FIG. 5. Increases in average activity, in a CIPS value, transition to higher P-states (e.g., from P-state 3 to P-state 2), or from the power saving mode to the performance mode are actions that may trigger the powering on of cache ways in order to resize cache 140 upward. Furthermore, it is noted that it is not necessary to transition each step in sequence, as shown in FIG. 5. For example, in one embodiment, a sudden increase in performance demand (e.g., due to detection of a high CIPS value) may result in a direct jump from (c) to (a).

It is noted that the events discussed above that trigger the cache resizing actions are exemplary, and that embodiments are possible and contemplated wherein cache resizing actions may be performed responsive to other triggering events. Furthermore, cache resizing actions may take place independent of certain events. Using the example of power management unit 150 of FIG. 4, decision unit 156 may receive notification of a change of P-state, operating mode, or other type of operating point change. These changes may be factored in a decision as to whether or not cache 140 is to be resized, but by themselves do not trigger the change in some embodiments.

In the example of FIG. 5, cache ways are powered up or powered down in powers of 2, with the exception of when entering or exiting a state where all ways are powered off. Thus, in downsizing actions, the number of cache ways powered down progresses from the original 16 ways, down to 8 ways, then 4 ways, then to 0 ways. Similarly, when upsizing the cache, the actions include turning on 4 ways, then sizing up to X ways, then to 16 ways. However, it is noted that embodiments are possible and contemplated wherein the downsizing and upsizing actions occur in increments different than those discussed here. For example, embodiments are possible and contemplated where a 16 way cache may be downsized or upsized in increments of 2 ways, allowing for 8 possible cache sizes. Embodiments are also possible wherein a cache may be downsized or upsized by one way per cache size increment.

Figure 6:
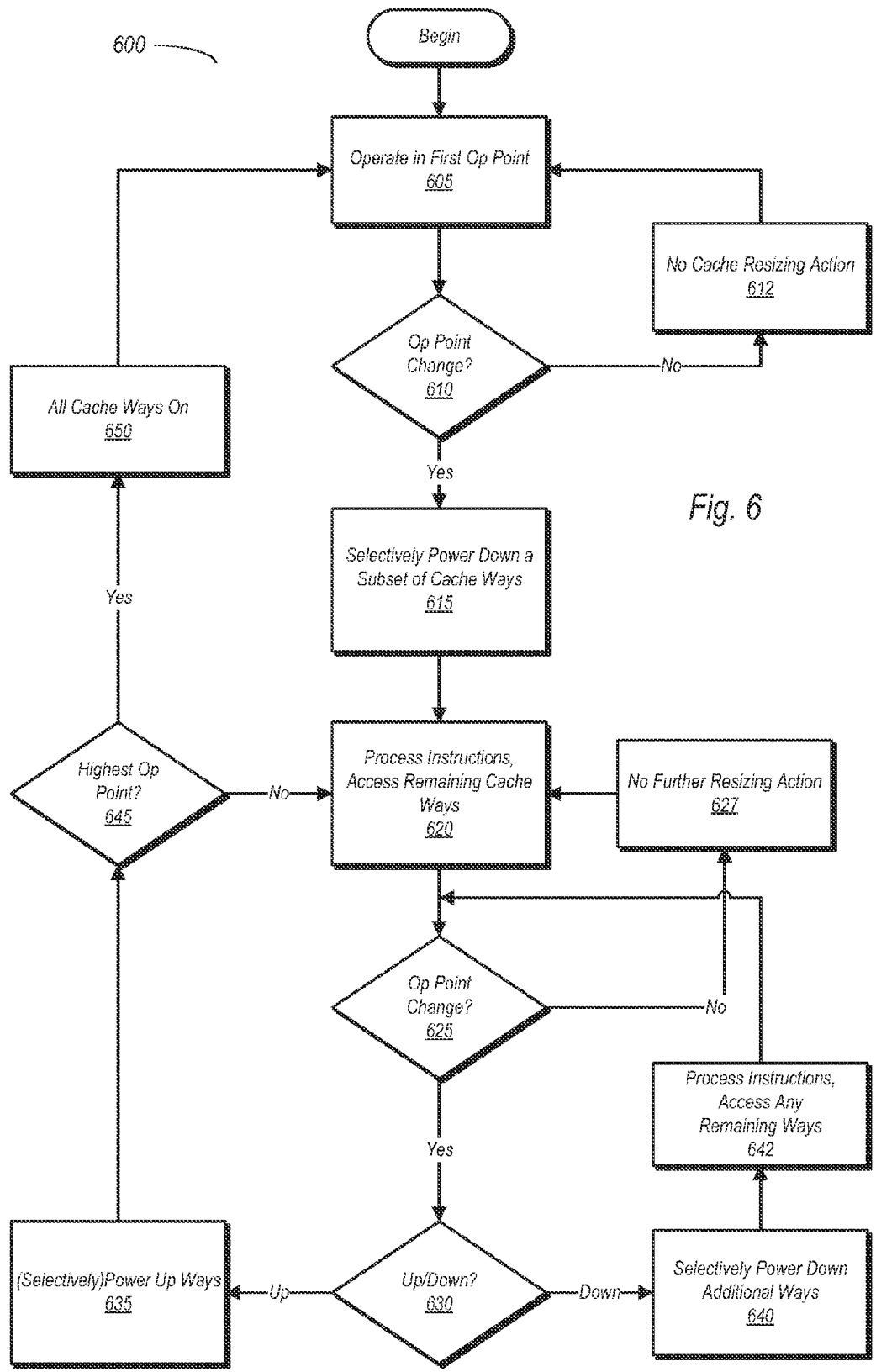
FIG. 6 is a flow diagram of one embodiment of a method of dynamic cache control.
Figure 7:
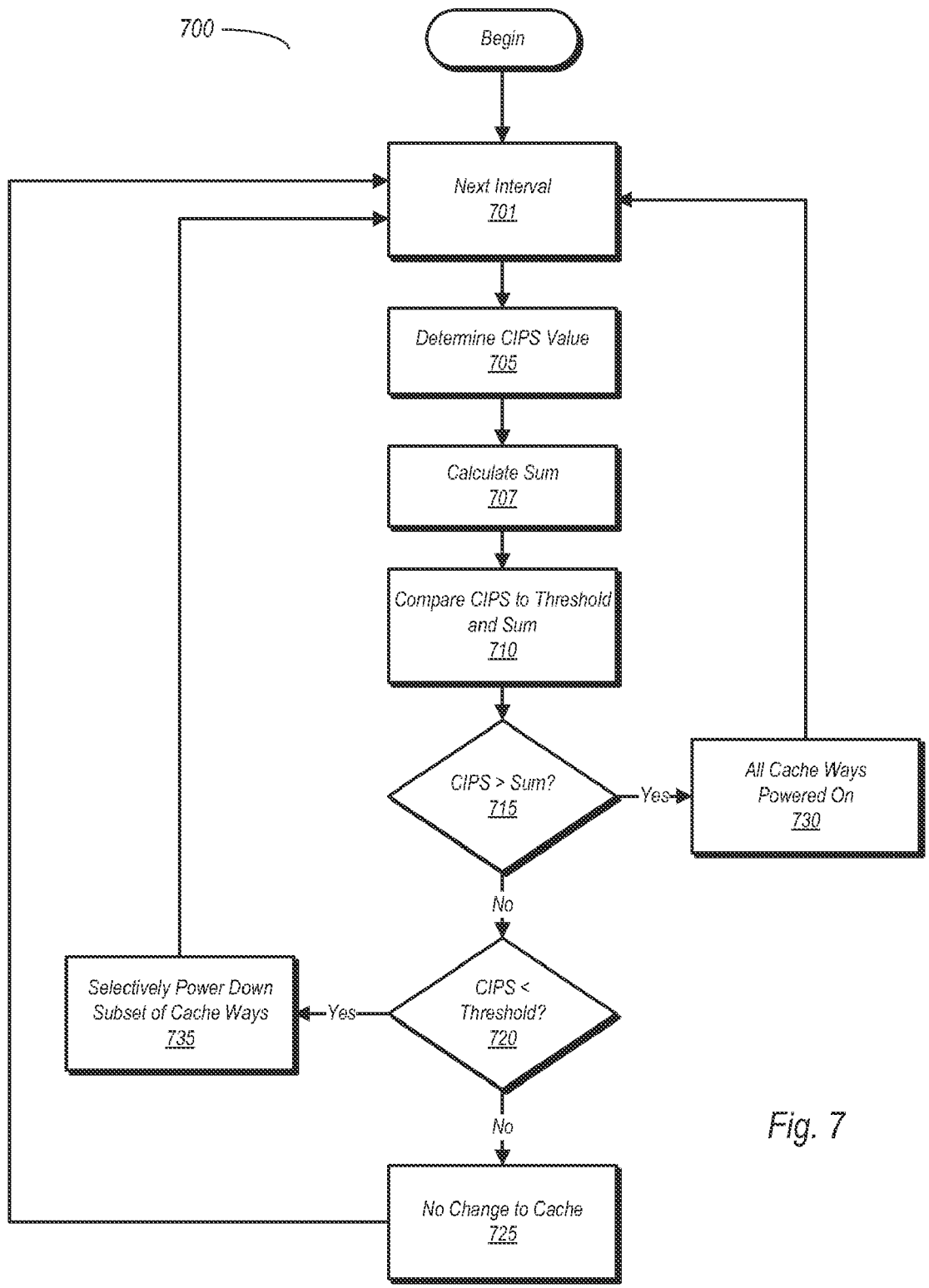
FIG. 7 is a flow diagram of another embodiment of a method of dynamic cache control.

Method Flow For Dynamic Cache Control:

FIGS. 6 and 7 illustrate two possible embodiments of methods for dynamically controlling the size of a cache. It should be noted that these embodiments are exemplary, and that other embodiments are possible and contemplated. It is also noted that a number of different methods may be available to a particular embodiment of power management unit 150 discussed above, and these methods may be combinable in some cases. For example, the method embodiments to be discussed in reference to FIGS. 6 and 7 may be partially or fully combined in order to determine whether or not cache resizing is to be performed responsive to a change in a processor operating point.

Turning now to FIG. 6, a flow diagram of one embodiment of a method of dynamic cache control is illustrated. In the embodiment shown, method 600 begins with a processor operating at a first operating point (block 605). For the purposes of this example, the operating point may be considered a highest performance operating point for a particular scheme (e.g., P-state 0 in accordance with Table 1 presented above). In the embodiment shown, if no change to the operating point occurs (block 610, No), then no cache sizing action occurs (block 612), and operation continues at the first operating point. However, if the operating point changes (block 610, Yes), then a subset of the ways of the cache may be powered down (block 615). The subset may include only a single way, a group of ways, or multiple groups of ways.

After the operating point change, processor operation may continue with the processing of instructions, which may include accesses of the cache in the remaining ways that are still powered up (block 620). If the operating point has not changed again (block 625, No), then no further cache resizing actions are taken (block 627), and operation may continue at the most recent operating point, including the processing of instructions and accessing data and/or instructions from any cache ways that remain powered up (block 620).

If another operating point change occurs (block 625, Yes), and the operating point change is downward to a lower performance or lower power state (block 630, Down), then additional ways of the cache may be powered down (block 640). The processing of instructions may continue, and this may include the accessing of any cache ways that remain powered up (block 642). If the another operating point change occurs (block 625, Yes), and the operating point change is to a higher performance state or one in which higher power consumption is permitted (block 630, Up), then the cache may be resized upward by selectively powering on cache ways that were previously powered down (block 635). If the new operating point is the highest performance operating point (block 645, Yes), then all cache ways may be powered on (block 650). If the new operating point is not the highest performance operating point (block 645, No), then operations may occur wherein some cache ways remain powered down, while those cache ways that are powered up may be accessed for retrieval of data and/or instructions.

Thus, in accordance with the embodiment of FIG. 6, method 600 may perform a progressive resizing of a cache downward as the operating point progresses from one of maximum performance toward one of minimum power consumption. The number of increments for cache resizing operations may depend on the number of operating points (e.g., the number of P-states), the number of cache ways or groups of ways, the size and manner of the increments by which the cache is powered down (e.g., from full, to ½, to ¼, etc.) and so forth. Similarly, method 600 may perform a progressive resizing of a cache upward as the operating point of the processor progresses from one of minimum power consumption to maximum performance.

It is noted that for each of the resizing actions discussed in reference to FIG. 7, a residency requirement may have to be established before the resizing action takes place. For example, in block 640, the powering down of additional cache ways may be inhibited or delayed if a sufficient amount of time has not elapsed since the previous cache resizing action. The residency requirement may be considered to be established once that particular amount of time has elapsed, and the resizing action may take place thereafter. Establishing a residency requirement for a cache size following a cache resizing action may prevent cache resizing from occurring too frequently. Resizing a cache too frequently may consume more power, degrade processing performance, and may cause undesirable noise in the power distribution system due to the frequent transients that result from powering on and powering off cache ways at a frequent interval. Accordingly, these undesirable effects may be prevented by the use of the residency requirement. A residency timer, such as residency timer 166 of FIG. 4, may be used to establish and enforce the residency requirement.

FIG. 7 is a flow diagram of another embodiment of a method of dynamic cache control. In this particular embodiment, method 700 is directed to determining whether cache resizing actions are to be taken based on a CIPS value. As previously discussed above, a CIPS value may be determined by receiving information regarding retired instructions, determining the number of instructions retired (i.e., wherein the results of the instruction execution are committed to registers) over a certain time interval, and extrapolating this value to one second.

Method 700 in this embodiment begins with the starting of a new time interval (block 701). A tally may be taken to determine the number of instructions retired with results committed to registers in the most recent previous time interval. From this value, the CIPS value may be determined (block 705). In addition to determining the CIPS value, a sum of a threshold and a guard band value may be calculated (block 707).

In one embodiment, the threshold value may be dependent on a particular P-state in which the processor is operating, although embodiments wherein the threshold value is not dependent on the P-state (e.g., is the same for all P-states) are also possible and contemplated. The threshold may be a certain CIPS value that is used for comparison purposes to the CIPS value determined for a given interval. The guard band may be a CIPS value that provides an additional margin for comparisons to ensure that certain factors may be accounted for (e.g., branch mispredictions which cause a flushing of the pipeline). In some embodiments, the guard band may be included in the CIPS calculation/determination, and thus no separate guard band needs to be included.

After the CIPS value and the sum are determined, the CIPS value may be compared to both the threshold value and the sum (block 710). IF the CIPS value is greater than the sum of the threshold value and the guard band (block 715, Yes), then the cache may be resized to power on all cache ways (block 730) if not already powered on. If the CIPS value is less than the sum (block 715, No), and is less than the threshold value (block 720, yes), then a cache resizing may be performed by selectively powering down a subset of the total number of cache ways (block 735). After the cache resizing action has been taken, no further action may be taken until the next interval begins (block 701).

If the CIPS value is less than the sum value (block 715, No) but greater than the threshold value (block 720, No), then the cache size may remain unchanged (block 725). No further cache resizing action may be performed until the next interval begins (block 701).

Many variations of embodiment 700 are possible and contemplated. For example, instead of powering one all cache ways responsive to a CIPS value being greater than the sum value, a selected subset of cache ways may be powered on. This may result in a situation wherein some, but not all cache ways are powered on, although more ways are powered on than in the previous interval. Furthermore, as noted above, method 700 may be used in conjunction with various embodiments of method 600 or any other suitable methodology for determining a cache resizing action.

Another variation may allow using difference CIPS thresholds based on the number of cache ways that currently powered up, since a CIPS value may be dependent on cache capacity. Thus, if cache ways have been powered down in such an embodiment, the CIPS threshold may also be reduced accordingly. In general, a number of different CIPS thresholds could be used, with each threshold corresponding to a particular cache capacity based on the number of ways that are powered on and off.

Figure 8:
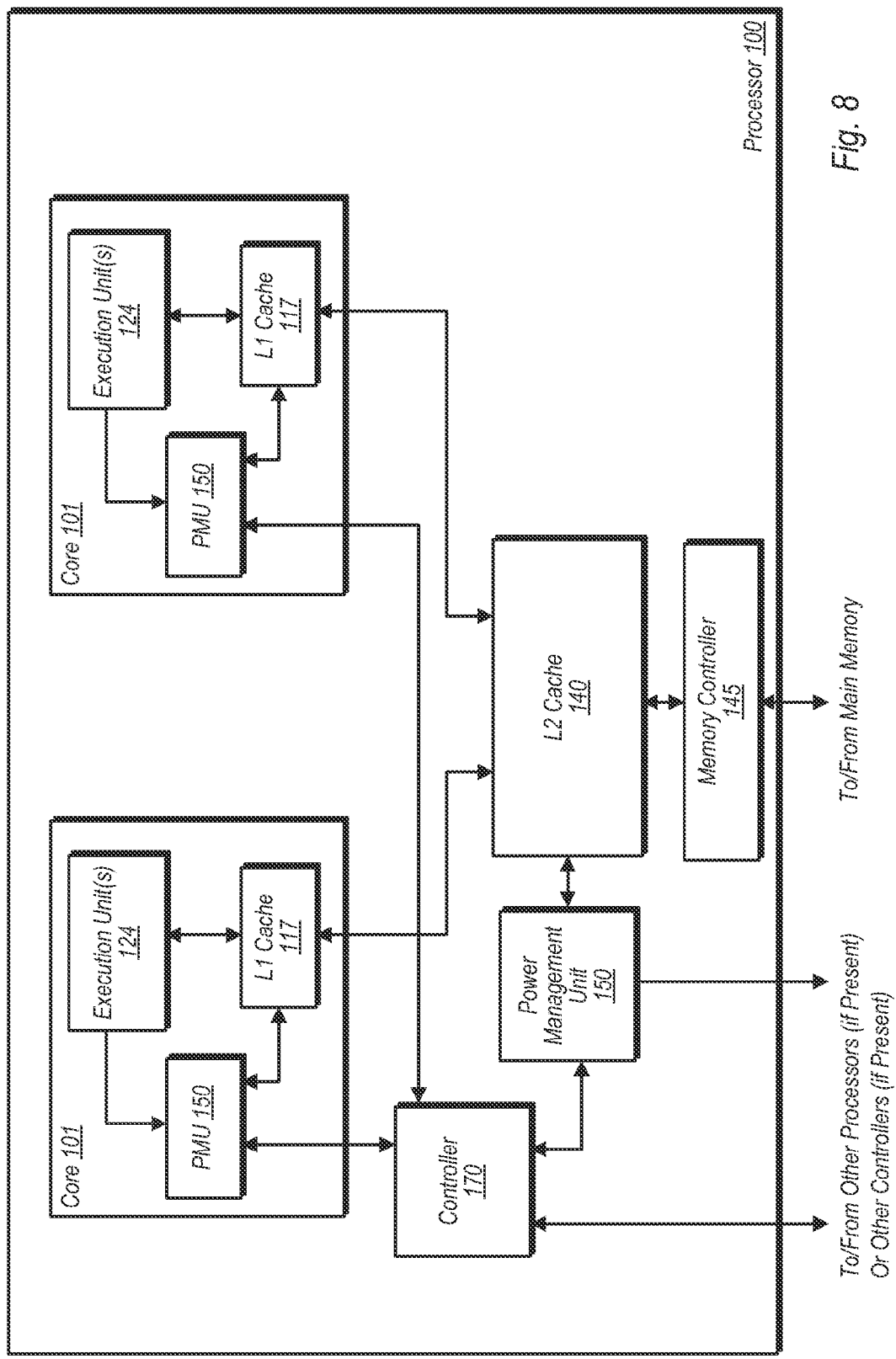
FIG. 8 is a block diagram of one embodiment of a multi-core processor.

Multi-Core Processor Embodiment:

FIG. 8 is a block diagram of one embodiment of a multi-core processor. In the embodiment shown, processor 100 includes two processor cores 101. However, embodiments having additional cores are possible and contemplated, and these cores may be identical to each other (i.e. processor 100 is a symmetric multi-core processor) or some of the cores may be different from one another (i.e. processor 100 is an asymmetric, or heterogeneous multi-core processor). Each core 101 in the embodiment shown includes execution unit(s) 124, an L1 cache 117, and a power management unit 150. Each core 101 may include additional units in accordance with the processor embodiments discussed above with reference to FIGS. 1 and 2. Furthermore, L1 cache 117 may be divided into separate instruction and data caches, in accordance with those same figures.

Power management unit 150 in each of cores 101 may be configured to perform resizing of its respective L1 cache 117 using the various methodologies discussed herein. Each power management unit 150 of the cores 101 may be arranged similarly to power management unit 150 shown in FIG. 4. Accordingly, a number of different factors may be considered in determining whether or not to resize a corresponding L1 cache 117, as well as determining how to resize those caches if it is determined that resizing is to be performed.

In addition to the power management units 150 in each core 101, processor 100 includes another power management unit 150 that is configured to perform resizing actions on L2 cache 140. The various methodologies used for determining resizing actions to be performed on L2 cache 140 may include any of those discussed above.

Although not explicitly shown, some embodiments of processor 100 may also include an L3 cache. In such embodiments, the inclusion of an L3 cache may be accompanied by the inclusion of another instance of power management unit 150. Alternatively, a single power management unit 150 may be utilized to control both of the L2 and L3 caches. In general, the number of caches included in a particular processor embodiment is not limited. Furthermore, while the discussion is directed to caches that store data and/or instructions, dynamic cache control as described herein may also be applied to other types of cache memories, such as a translation lookaside buffer (TLB) used for storing address translation information.

Processor 100 also includes a controller 170 that is coupled to each of the power management units 150. In some embodiments, controller 170 may provide the functions that were otherwise provided by state controller 135, as shown in FIG. 2. Although not explicitly shown here, processor 100 may include clock control circuitry and an adjustable voltage regulator (e.g., such as clock control circuit 136 and adjustable voltage regulator 137 shown in FIG. 2) implemented on the same IC die as the other units of processor 100. In one embodiment, if set as a whole for the IC die, the voltage may be set as the maximal voltage needed for the P-state of all of the cores 101. Another embodiment may involve software setting P-state for all cores based on the highest performance P-state needed for any of the cores 101. In general, controller 170 may be configured to set the operating voltage and clock frequency (i.e. the P-state) for each core 101, as well as for processor 100 as a whole. P-states for cores 101 may in some cases be bounded by the P-state of processor 100 as a whole. Furthermore, controller 170 in the embodiment shown is configured to set the P-states of cores 101 individually with respect to each other. Responsive to an increased workload for one or all of the processor cores 101, controller 170 may increase their respective P-states and/or increase the P-state of processor 100 as a whole in order to meet the demand.

Since controller 170 may control the P-states of cores 101 and processor 100 as a whole, controller 170 may thus control power allocation among the cores 101. For example, if an L1 cache of a first one of cores 101 is resized downward (e.g., responsive to a low CIPS value), controller 170 may allocate the saved power to a second core 101, and may also adjust its P-state to meet a greater workload demand. In some cases, controller 170 may allocate extra power to one or more additional cores as a result of the extra power available due to a cache downsizing Controller 170 may also adjust the P-states of the cores in such a situation. The P-state of that core 101, enabling it to meet a greater workload demand. In some cases, controller 170 may instruct the power management unit 150 coupled to L2 cache 140 to resize downward in order to enable extra power to be allocated to one or more of the cores 101.

Controller 170 may receive information regarding the status of each of the L1 caches and the L2 cache from a notification unit 160 implemented within their respective power management units 150, Controller 170 may also send information to the decision units 156 of each of the power management units 150 in order to indicate various status changes, such as an update of a P-state of one or more cores 101.

In general, controller 170 may track the power usage by cores 101, L2 cache 140, and may also track the power usage of other units of processor 100 (e.g., a memory controller), and may perform power control and allocation actions based on the tracked power usage. Based on the information regarding the power usage of cores 101, L2 cache 140, and other units of processor 100, controller 170 may perform power allocation actions in order to enable processor 100 to maximize its performance per watt of power consumed.

Figure 9:
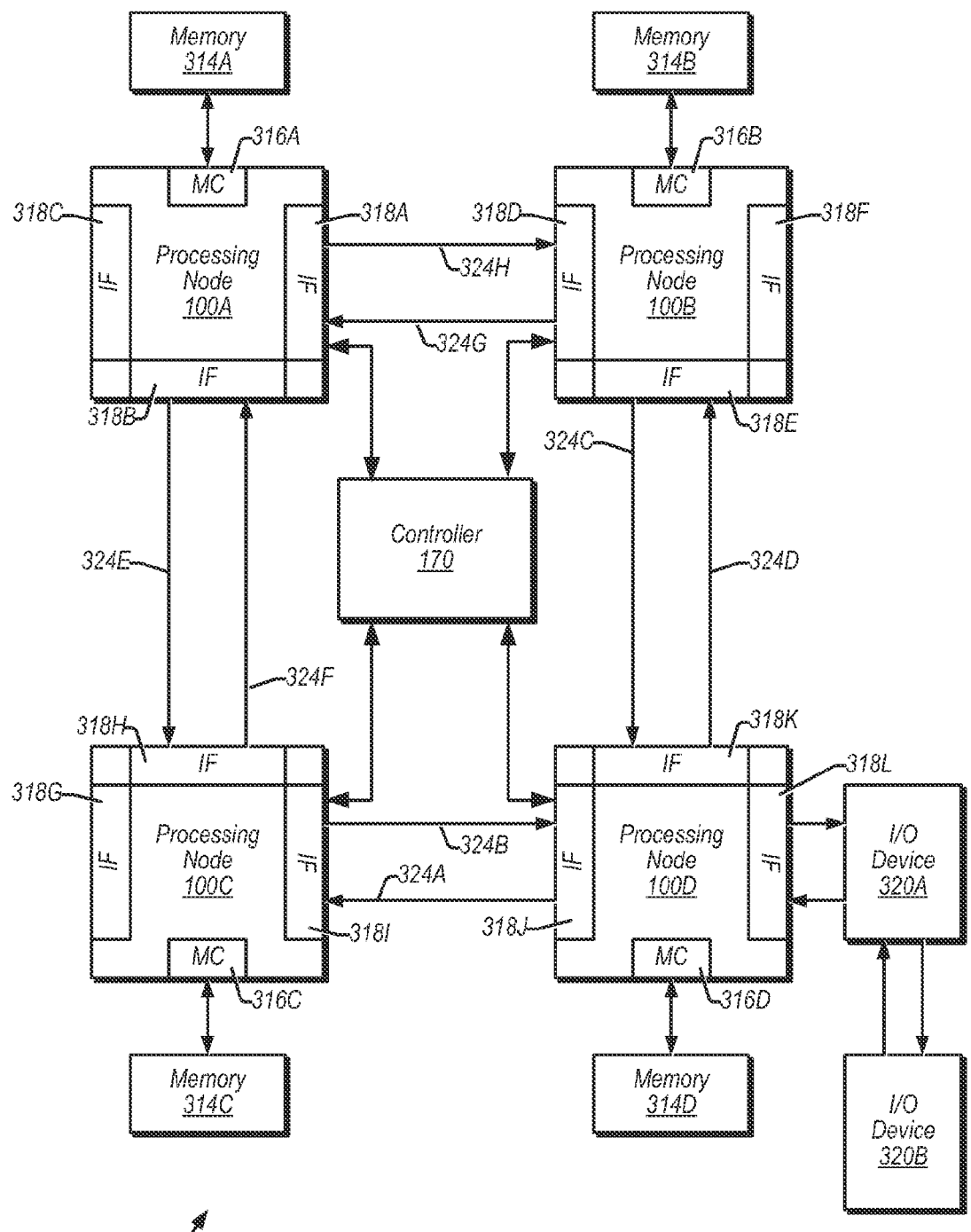
FIG. 9 is a block diagram of one embodiment of a computer system.

Computer System:

Turning now to FIG. 9, an embodiment of a computer system 300 is shown. In the embodiment of FIG. 9, computer system 300 includes several processing nodes 100A, 100B, 100C, and 100D. One or more of processing nodes 100A-100D may be a processor according to one of the embodiments of FIGS. 1, 2, or 8 discussed above, or a variation of one of those embodiments. Accordingly, one or more of processing nodes 100A-100D may include one or more power management units 150 configured to perform dynamic resizing of one or more cache memories in the respective processing node, in accordance with various embodiments of the methodologies discussed above.

Each processing node 100A-100D is coupled to a respective memory 314A-314D via a memory controller 316A-316D included within each respective processing node 100A-100D. One or more of these memory controllers 316A-316D may be configured in accordance with an embodiment of a memory controller 18 as discussed above. Thus, in processing units that are so configured, power management may be conducted to minimize the use of power by a corresponding memory subsystem.

Each of processing nodes 100A-100D includes interface logic used to communicate between the processing nodes 100A-100D. For example, processing node 100A includes interface logic 318A for communicating with processing node 100B, interface logic 318B for communicating with processing node 100C, and a third interface logic 318C for communicating with yet another processing node (not shown). Similarly, processing node 100B includes interface logic 318D, 318E, and 318F; processing node 100C includes interface logic 318G, 318H, and 318I; and processing node 100D includes interface logic 318J, 318K, and 318L. Processing node 100D is coupled to communicate with a plurality of input/output devices (e.g. devices 320A-320B in a daisy chain configuration) via interface logic 318L. Other processing nodes may communicate with other I/O devices in a similar fashion.

Processing nodes 100A-100D implement a packet-based link for inter-processing node communication. In the present embodiment, the link is implemented as sets of unidirectional lines (e.g. lines 324A are used to transmit packets from processing node 100A to processing node 100B and lines 324B are used to transmit packets from processing node 100B to processing node 100A). Oilier sets of lines 324C-324H are used to transmit packets between other processing nodes as illustrated in FIG. 4. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Embodiments are also possible and contemplated wherein communication between a processing node and an I/O device is performed in a cache coherent fashion. Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 100A to processing node 100D may pass through either processing node 100B or processing node 100C as shown in FIG. 9. Any suitable routing algorithm may be used. Other embodiments of computer system 300 may include more or fewer processing nodes then the embodiment shown in FIG. 9.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 100A-100D, in addition to a memory controller and interface logic, may include one or more processors. Broadly speaking, a processing node comprises at least one processor and may optionally include a memory controller for communicating with a memory and other logic as desired. More particularly, each processing node 100A-100D may comprise one or more copies of processor 10 as shown in FIG. 1 (e.g. including various structural and operational details shown in FIGS. 2-3). One or more processors may comprise a chip multiprocessing (CMP) or chip multithreaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 100A-100D may include a memory map used to determine which addresses are mapped to which memories 314A-314D, and hence to which processing node 100A-100D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Computer system 300 also includes a controller 170 coupled to each of processing nodes 100A-100D. Controller 170 may perform functions similar to controller 170 shown in FIG. 8, but on a system level rather than on a processor level. That is, controller 170 may track the power usage by each of processing nodes 100A-100D, may change their operating points accordingly, and may re-allocate power from one of the processing nodes to one or more of the other processing nodes. It is noted that while controller 170 is shown here as being separate from each of processing nodes 100A-100D, embodiments are possible wherein a controller 170 implemented on one of the processing nodes performs the system level power tracking and allocation functions.

It is noted that while the various embodiments of the processor and system discussed above were directed toward computer systems and their corresponding processors, it is noted that the methods and apparatuses discussed above may be applied to other types as well. In general, any type of processor including a cache may be suitable for implementation of the dynamic cache resizing methods discussed above. Furthermore, any type of system that includes a processor may also be suitable for the dynamic cache resizing methods disclosed above, including server systems, desktop system, and portable computers. In addition, other types of platforms and their respective processors may be suitable for dynamic cache resizing. Such platforms may include 'smart' phones, personal digital assistants, embedded controllers, and so forth.

Figure 10:
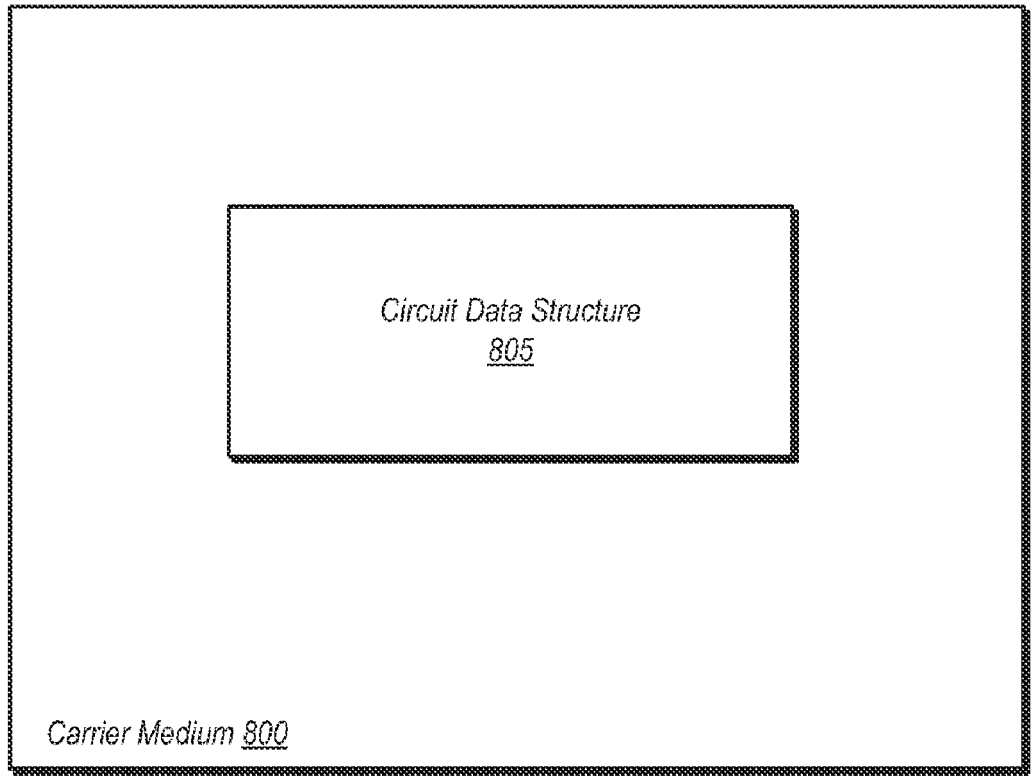
FIG. 10 is a block diagram of one embodiment of a carrier medium.

Computer Readable Medium:

Turning next to FIG. 10, a block diagram of a computer accessible storage medium 800 including a database representative of the processor 100 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R. DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM. Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the database of the processor carried on the computer accessible storage medium 100 may be a database which can be read by a program and used, directly or indirectly, to fabricate the hardware comprising the system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 100. The netlist may then be placed and routed to produce a data set describing geometric shapes to be applied to masks. The masks may then be used in various semiconductor fabrication steps to produce a semiconductor circuit or circuits corresponding to the processor 100. Alternatively, the database on the computer accessible storage medium 800 may be the netlist (with or without the synthesis library) or the data set, as desired.

While the computer accessible storage medium 800 carries a representation of the processor 100, other embodiments may carry a representation of any portion of the processor 100, as desired, including any set of agents (e.g. the L2 cache 140, the power management unit 150, etc.), portions of an agent, or portions thereof.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
    changing the operating point of a processor from a first operating point to a second operating point;
    reading a committed instructions per second (CIPS) value;
    calculating a sum of a threshold value and a guard band value;
    comparing the CIPS value to the threshold value and the sum;

selectively removing power from one or more ways of a cache memory responsive to changing to the second operating point if the CIPS value is less than the threshold value;

powering on all ways of the cache memory if the CIPS value is greater than the sum;

wherein no additional ways of the cache memory are powered on or off if the CIPS value is greater than the threshold value and less than the sum; and processing one or more instructions in the processor subsequent to altering power of the one or more ways of the cache memory, wherein said processing includes accessing one or more ways of the cache memory from which power was altered.

2. The method as recited in claim 1, wherein altering power of one or more cache ways comprises removing power from the one or more cache ways.

3. The method as recited in claim 1, wherein changing the operating point comprises changing an operating voltage and a clock frequency at which the processor operates.

4. The method as recited in claim 1, wherein changing the operating point comprises changing from a high performance operating mode to a power saving mode.

5. The method as recited in claim 1, further comprising removing power from half of a plurality of currently active ways of the cache memory responsive to changing the operating point.

6. The method as recited in claim 1, further comprising:
changing the operating point of the processor from the second operating point to a third operating point; and
selectively removing power from one or more additional ways of a cache memory responsive to changing the operating point.

7. The method as recited in claim 6, further comprising:
changing the operating point of a processor from the third operating point to one of the first or second operating points; and
selectively applying power to one or more ways from which power was removed when the operating point was changed from the first operating point to the second operating point or the second operating point to the third operating point.

8. The method as recited in claim 1, further comprising sending a notification to one or more additional processors indicating that one or more ways of the cache memory have been powered down.

9. The method as recited in claim 1, further comprising:
determining an amount of time that has elapsed since selectively removing power from one or more ways of the cache memory;
comparing the amount of time to a first time threshold; and
preventing additional ways of the cache memory from being powered down if the amount of time is less than the first time threshold.

10. The method as recited in claim 9, further comprising:
comparing the amount of time to a second time threshold; and
preventing additional ways of the cache memory from being powered up if the second amount of time is less than the second time threshold.

11. A processor comprising:
a power management unit configured:
change the operating point of the processor from a first operating point to a second operating point;
read a committed instructions per second (CIPS) value;
calculate a sum of a threshold value and a guard band value;
compare the CIPS value to the threshold value and the sum;
selectively alter power of a first subset of a plurality of ways of a cache memory responsive to changing to the second operating point if the CIPS value is less than the threshold value;
power on all ways of the cache memory if the CIPS value is greater than the sum;
wherein no additional ways of the cache memory are powered on or off if the CIPS value is greater than the threshold value and less than the sum; and
wherein the at least one execution unit of the processor is configured to, subsequent to selectively altering power of the first subset of the plurality of ways, access one or more ways of a second subset of the plurality of ways from which power was altered.

12. The processor as recited in claim 11, wherein altering power of the first subset of ways comprises removing power from the first subset of ways.

13. The processor as recited in claim 11, wherein the power management unit is further configured to change the operating point of the processor by causing a change to an operating voltage and a clock frequency at which the processor operates.

14. The processor as recited in claim 11, wherein the processor is configured to operate in a high performance mode and in a power saving mode, wherein changing the operating point comprises changing from a high performance operating mode to a power saving mode.

15. The processor as recited in claim 11, wherein the power management unit is configured to power down one half of a plurality of active ways of the cache memory responsive to changing the operating point.

16. The processor as recited in claim 11, wherein the power management unit is further configured to selectively remove power from one or more additional ways of a cache memory responsive to the processor changing the operating point from the second operating point to a third operating point.

17. The processor as recited in claim 16, wherein the power management unit is configured to selectively apply power to one or more ways from which power was previously removed responsive to changing the operating point of the processor from the third operating point to one of the first or second operating points.

18. The processor as recited in claim 11, wherein the power management unit is further configured to send a notification to one or more additional processors to indicate that one or more ways of the cache memory have been powered down.

19. A method comprising:
calculating a first threshold value and a second threshold value, wherein the second threshold value is a sum of the first threshold value and a guard band value;
comparing a workload indicator value to first the threshold value and the second threshold value, wherein the workload indicator value is a committed instructions per second (CIPS) value indicative of a number of instructions for which corresponding results are committed to registers each second;
selectively removing power from a subset of a plurality of ways of a cache memory if a workload indicator value of a processor is less than a first threshold value; and
powering on any previously powered down ways of the cache memory if the workload indicator value is greater than a second threshold;
wherein power to ways of the cache memory is altered if the workload indicator value is greater than the first threshold value and less than the second threshold.

20. The method as recited in claim 19, further comprising determining the workload indicator value for a processor that includes the cache memory.

21. The method as recited in claim 19, further comprising:
determining an amount of time that has elapsed since selectively removing power from one or more ways of the cache memory;
comparing the amount of time to a first time threshold; and
preventing additional ways of the cache memory from being powered down if the amount of time is less than the first time threshold.

22. The method as recited in claim 19, further comprising:
sending a first notification to one or more additional processors if the first subset of ways is powered down, the first notification indicating the powering down of the first subset of ways; and
sending a second notification to the one or more additional processor responsive to powering up any previously powered down ways of the cache memory, the second notification indicating that the previously powered down ways of the cache memory have been powered up.

23. A method comprising:
changing a performance state of a processor from a first performance state to a second performance state, wherein the first performance state comprises operating a core of the processor at a first voltage and a first clock frequency, and wherein the second performance state comprises operating the core at a second voltage less than the first voltage and a second clock frequency less than the first clock frequency;
reading a committed instructions per second (CIPS) value;
calculating a sum of a threshold value and a guard band value;
comparing the CIPS value to the threshold value and the sum;
selectively removing power from one or more ways of a cache memory responsive to changing to the second performance state if the CIPS value is less than the threshold value;
powering on all ways of the cache memory if the CIPS value is greater than the sum,
wherein no additional ways of the cache memory are powered on or off if the CIPS value is greater than the threshold value and less than the sum; and
processing one or more instructions in the core of the processor subsequent to removing power from the one or more ways of the cache memory, wherein said processing includes the core accessing one or more ways of the cache memory from which power was not removed.

24. The method as recited in claim 23, further comprising:
changing the performance state of the processor from the second performance state to a third performance state, wherein the third performance state comprises operating the core at a third voltage and a third clock frequency, the third voltage being less than the second voltage and the third clock frequency being less than the second clock frequency;
selectively removing power from one or more additional ways of the cache memory responsive to changing from the second performance state to the third performance state; and
processing one or more instructions in the core of the processor subsequent to removing power from the one or more additional ways, wherein said processing includes the core accessing one or more ways of the cache memory from which power was not removed.

25. The method as recited in claim 24, further comprising:
changing the performance state of the processor from the third performance state to one of the first or second performance states; and
selectively powering up one or more of the cache ways that were previously powered down.

26. The method as recited in claim 23, further comprising comparing an amount of time since power was selectively removed from the one or more of the cache ways to a first residency requirement and a second residency requirement, wherein the method further includes preventing any additional cache ways from being powered down if the amount of time is less than the first residency requirement and preventing any additional cache ways from being powered up if the amount of time is less than the second residency requirement.

27. A computer readable medium comprising a data structure which is operated upon by a program executable on a computer system, the program operating on the data structure to perform a portion of a process to fabricate an integrated circuit including circuitry described by the data structure, the circuitry described in the data structure including:
a power management unit configured to
change the operating point of a processor from a first operating point to a second operating point;
read a committed instructions per second (CIPS) value;
calculate a sum of a threshold value and a guard band value;
compare the CIPS value to the threshold value and the sum;
selectively alter power of a first subset of a plurality of ways of a cache memory responsive to changing to the second operating point if the CIPS value is less than the threshold value;
power on all ways of the cache memory if the CIPS value is greater than the sum;
wherein no additional ways of the cache memory are powered on or off if the CIPS value is greater than the threshold value and less than the sum; and
wherein the at least one execution unit is configured to, subsequent to selectively altering power of the first subset of the plurality of ways, access one or more ways of a second subset of the plurality of ways from which power was altered.

28. The computer readable medium as recited in claim 22, wherein the data structure comprises one or more of the following types of data:
HDL (high-level design language) data;
RTL (register transfer level) data;
Graphic Data System (GDS) II data.

* * * * *